(12) United States Patent
Guidish et al.

(10) Patent No.: US 10,302,121 B2
(45) Date of Patent: May 28, 2019

(54) DEFORMABLE WASHER WITH ADDITIVE DISPENSER AND METHOD OF MANUFACTURE

(71) Applicants: Jerome J. Guidish, Naples, FL (US); Douglas Guidish, Naples, FL (US)

(72) Inventors: Jerome J. Guidish, Naples, FL (US); Douglas Guidish, Naples, FL (US)

(73) Assignee: Accurate Site Development, Inc., Naples, FL (US)

( * ) Notice: Subject to any disclaimer, the term of this patent is extended or adjusted under 35 U.S.C. 154(b) by 125 days.

(21) Appl. No.: 15/345,335

(22) Filed: Nov. 7, 2016

(65) Prior Publication Data

US 2017/0130761 A1 May 11, 2017

Related U.S. Application Data

(60) Provisional application No. 62/252,161, filed on Nov. 6, 2015.

(51) Int. Cl.
*F16B 39/00* (2006.01)
*F16B 43/00* (2006.01)
*F16B 39/22* (2006.01)

(52) U.S. Cl.
CPC .......... *F16B 43/001* (2013.01); *F16B 39/225* (2013.01)

(58) Field of Classification Search
CPC .............................. F16B 43/001; F16B 39/225
USPC ........................... 411/82, 82.3, 8, 10, 13, 258
See application file for complete search history.

(56) References Cited

U.S. PATENT DOCUMENTS

| | | | | |
|---|---|---|---|---|
| 2,666,354 A | * | 1/1954 | Dim | F16B 43/001 118/264 |
| 3,137,268 A | * | 6/1964 | Hornwood | E21D 21/02 116/202 |
| 3,212,387 A | | 10/1965 | Madansky | |
| 3,938,571 A | | 2/1976 | Heighberger | |
| 4,514,125 A | * | 4/1985 | Stol | F16B 13/143 156/294 |
| 4,659,268 A | * | 4/1987 | Del Mundo | F16B 19/04 411/34 |
| 4,681,493 A | * | 7/1987 | Vollmer | F16B 13/066 411/19 |
| 4,830,558 A | * | 5/1989 | Sweeney | F16B 13/143 248/205.3 |
| 5,009,316 A | * | 4/1991 | Klein | B01L 9/06 206/443 |
| 5,281,065 A | * | 1/1994 | Wu | F16J 15/064 411/258 |
| 5,339,593 A | * | 8/1994 | Ludwig | F16B 13/00 411/82 |
| 6,129,326 A | | 10/2000 | Mandon | |
| 7,694,978 B2 | | 4/2010 | Starr | |

(Continued)

FOREIGN PATENT DOCUMENTS

CN 200999861 U 1/2008

*Primary Examiner* — Gary W Estremsky
(74) *Attorney, Agent, or Firm* — Cherskov Flaynik & Gurda, LLC

(57) ABSTRACT

A washer with integrated fluid distribution which includes a body with an outer ring having an aperture located centrally within said ring, a channel enclosed within said outer ring and a release channel in fluid communication with said aperture and an interior surface of said channel and wherein said channel is filled with a dispensing fluid and said release channel is reversibly closed.

11 Claims, 6 Drawing Sheets

(56) References Cited

U.S. PATENT DOCUMENTS

| | | | |
|---|---|---|---|
| 8,092,128 B1 | 1/2012 | Bray et al. | |
| 8,118,526 B2 | 2/2012 | Dowling | |
| 8,920,088 B1 * | 12/2014 | Garvin | F16B 15/0092 |
| | | | 411/442 |
| 9,019,683 B2 | 4/2015 | Day et al. | |
| 9,541,117 B2 * | 1/2017 | Handa | |
| 2015/0107185 A1 * | 4/2015 | Kose | F16J 15/14 |
| | | | 52/741.1 |
| 2017/0130843 A1 * | 5/2017 | Singh | F16J 15/122 |

* cited by examiner

DEFORMABLE WASHER WITH ADDITIVE DISPENSER AND METHOD OF MANUFACTURE

PRIORITY CLAIM

The instant application claims priority as a non-provisional application of U.S. Provisional Application 62/252,161, filed on Nov. 6, 2015.

BACKGROUND OF THE INVENTION

1. Field of the Invention

The field of the invention is a washer having an integrated additive dispenser within a deformable washer body.

2. Background of the Invention

Traditionally, when working with workpieces such as screws or nails that require an additive at the time of installation, the screw or nail is dipped or rubbed in the additive. The additive then drips and precise application of the additive is impossible. Quantities of the additive are wasted through either drips or due to initial over-application of additive which simply discharges out when the workpiece is finally installed. For instance, during installations of mechanical screws in the maritime industry, frequently the screws are first coated with a silicone additive. However, the silicone is difficult to contain and can damage or stain surrounding surfaces. Once a container of an additive is opened, it begins reacting with the surrounding atmosphere and will degrade. However, an entire container must be opened, even if a single screw is to be installed.

A need exists in the art for a device that can combine a flexible washer with a means to dispense a flowable additive, and a method of manufacturing such a washer. A need exists for a single-use dispenser of additive liquid which minimizes waste and delivers the additive liquid to its intended site.

SUMMARY OF INVENTION

An object of the invention is to create a method and device for automatically applying sealant, lubricant, and other such liquid, during fastening operations and configurations that overcomes many of the drawbacks in the prior art. A feature of the invention is that dispensing occurs after the fastener is installed and before it is finally tightened. An advantage of the invention is that it accepts many types of additive to facilitate its subsequent dispersion.

Another object of the invention is to prevent waste in the application of sealant, lubricant, flowable insulation material, and the like, during application of fasteners such as nuts, bolts and washers. A feature of the invention is that only the quantity needed for a single installation is added to a washer. An advantage of the invention is that it prevents the waste of every additive.

Another object of the invention is to prevent waste. A feature of the invention is that only the quantity needed for a single installation is added to a washer. An advantage of the invention is that it prevents the waste of every additive.

Yet another object of the invention is to provide a washer that can be installed on uneven surfaces. A feature of the invention is that the main body of the washer comprises a flexible substrate. An advantage of one embodiment is that it can be installed on surfaces having various topologies, such as planar, nonplanar, smooth, rough, straight, curved, convex, and concave.

A further object of the invention is to provide an automatic dispensing device which starts a flow of the additive liquid without user interaction. A feature of the invention is that the liquid exits the washer when a fastener breaches a seal. An advantage of the system is that the dispensing begins without separate piercing of a container.

Another object of the invention is to provide washers with many different additives. A feature of the invention is in one embodiment, different additives contained by washers are distinguished by different colors or shapes. A benefit of the invention is that an end user can quickly select the proper additive/washer combination for a job.

An additional object of the invention is to support additives of various viscosities. A feature of the invention is that the size and other properties of the exit channel are optimized to maintain flow of an additive fluid. A benefit of the system is that many different types of additives may be supported by different embodiments.

A further object of the invention is to support dispensing of additives which require hermetic seals. A feature of the system is that it includes an optional air-tight or nearly air-tight sealing system for additives. A benefit of the system is that it allows for dispensing of additives which quickly degrade in air or quickly dry out.

An additional object of the invention is to support dispensing of two-part additives. A feature of the invention is that the in one embodiment the system includes more than one exit channel, in another embodiment the system comprises a washer with two internal channels. A benefit of the invention is that in some embodiments, the system allows for dispensing of multiple-part additives.

A further object of the invention is to provide a device for using additives which has a clear total inventory on hand before starting a job. A feature of the invention is that each additive washer contains a proper amount of additive fluid. A benefit of the invention is that it allows an end-user to accurately count the amount of additive on hand for a given job as it corresponds to the number of washers.

An additional object of the invention is preventing waste. A feature of the invention is that multiple containers of additives do not have to be opened for a job which requires many different additives. A benefit of the invention is that the end user does not need to limit a job to only the available containers nor does the user need to open multiple containers for every job.

A further object of the invention is to facilitate direct accounting of used high-value additives. A feature of the invention is that for high-value additives, the washers include a tracking insignia. A benefit of the invention is that high-value additives are not wasted, lost, or stolen and can optionally be inventoried.

An additional object of the invention is to provide a recyclable system. In one embodiment, a feature of the invention is that each washer main body comprises a recyclable material. A benefit of the system is that it allows for the recycling of products after their removal.

A washer with integrated fluid distribution is disclosed comprising: a body defining an outer ring having an aperture located centrally within said ring; and a channel enclosed within said outer ring and a release channel in fluid communication with said aperture and an interior surface of said channel; wherein said channel is filled with a dispensing fluid and said release channel is reversibly closed.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1A:
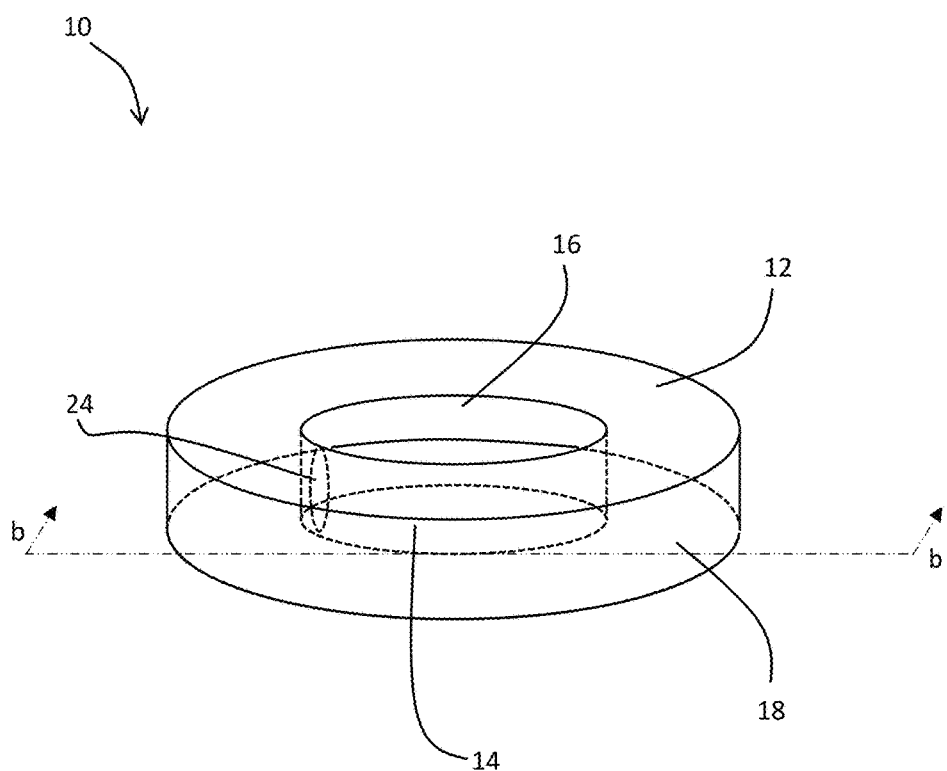
FIG. 1A depicts an overview of one embodiment of the invention.

In various embodiments, the invention provides a means for dispensing of an additive when installing a washer. The additive is integral to the washer body. The additive may be a sealant, adhesive, epoxy, or other additive used in conjunction with the washer.

In one embodiment, the invention comprises a washer with a deformable body. At least one fluid containing channel is defined within the deformable body. The fluid channel includes one or more openings which allow for fluid communication between the channel and the exterior of the washer body. Upon application of force to the deformable body, the fluid exits the at least one opening. Until force is applied, the fluid is not exposed to the atmosphere and therefore the fluid does not dry out or otherwise react.

The foregoing summary, as well as the following detailed description of certain embodiments of the present invention, will be better understood when read in conjunction with the appended drawings.

To the extent that the figures illustrate diagrams of the functional blocks of various embodiments, the functional blocks are not necessarily indicative of the division between hardware circuitry. Thus, for example, one or more of the functional blocks (e.g. processors or memories) may be implemented in a single piece of hardware (e.g. a general purpose signal processor or a block of random access memory, hard disk or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Turning to the figures, FIG. 1A depicts an overview of one embodiment of the invention. The device 10 is defined by a washer main body 12. As shown in FIG. 1A, the main body comprises a generally toroidal shape. However, in other embodiments, the main body 12 comprises a rectangular shape, a square shape, and other shapes, depending on the required application. A main body 12 in the shape of a square would facilitate the flow as the rotational effect of the screw would still apply pressure to the deformable screw body.

In one embodiment, the main body 12 has a height equivalent to a regular washer as the main body accommodates only small quantities of additive—a single application of the additive. The quantity of additive used with each washer configuration is optimized to be a single dose of the additive. For example, when the additive comprises acrylic caulk, the amount is equivalent to two small beads from a caulking gun.

Each main body 12 contains a central aperture 14. A workpiece, such as a screw or a nail is received by the washer by traversing the central aperture 14. The central aperture 14 is formed by a main body 12 internal wall 16, which wraps around and turns into an external main body surface 18. In turn, the external main body surface 18 wraps around the main body 12 to the internal wall 16. In one embodiment, the aperture 14 internal wall 16 is smooth, in other embodiments, the aperture 14 internal wall 16 includes threads or other groove elements to help position the workpiece within the aperture 14. In one embodiment, the aperture 14 has the same diameter as standard washer diameters, such as shown in the following table.

| Washer Size (in inches) | Inside Diameter (in inches) |
| --- | --- |
| 3/16 | 1/4" |
| 1/4 | 5/16" |
| 5/16 | 3/8" |
| 3/8 | 7/16" |
| 7/16 | 1/2" |
| 1/2 | 9/16" |
| 9/16 | 5/8" |
| 5/8 | 11/16" |
| 3/4 | 13/16" |
| 7/8 | 15/16" |
| 1 | 1 1/16" |
| 1 1/8 | 1 1/4" |
| 1 1/4 | 1 3/8" |
| 1 3/8 | 1 1/2" |
| 1 1/2 | 1 5/8" |
| 1 5/8 | 1 3/4" |
| 1 3/4 | 1 7/8" |
| 1 7/8 | 2" |
| 2 | 2 1/8" |
| 2 1/2 | 2 5/8" |
| 3 | 3 1/8" |

By employing standard sizes, the washer can be deployed in any application that requires both a washer and an additive, without requiring the use of special screws or tools specific to the washer installation.

In some embodiments, the internal wall 16 comprises a deformable material, such that the diameter of the aperture 14 decreases as force is applied to the main body 12, resulting in a tighter seal. In another embodiment, the internal wall 16 is rigid (except for the fluid exit 24 described below) and so the device 10 acts in place of a standard metallic washer.

Defined within the internal wall 16 is a fluid exit 24. The fluid exit 24 comprises a means of communication between the interior of the main body 12. As shown in the embodiment in FIG. 1A, the fluid exit 24 is substantially round. In other embodiments, the fluid exit 24 may take on different shapes, such as an oblong shape, or an irregular shape, depending on the type of fluid being dispensed by the device 10.

As shown in FIG. 1A, the additive is stored within the main body of the washer, in one embodiment, without the use of an internal bladder. In this way, the washer can be readily assembled without first installing a filled additive bladder. For additives that are particularly sensitive to exposure to the external atmosphere, each washer is placed in a hermetically sealed pouch (not shown) after manufacturing.

Figure 1B:
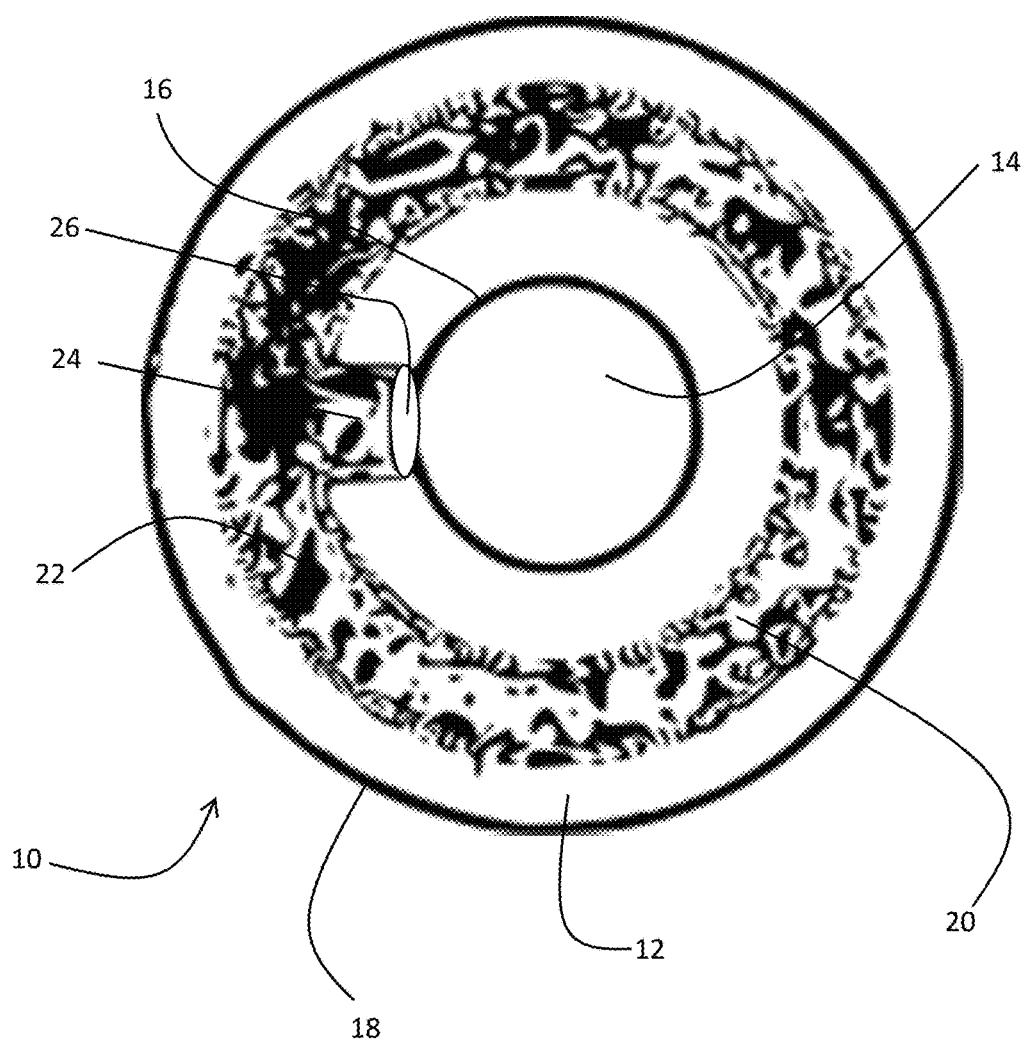
FIG. 1B depicts a cut-away view of one embodiment of the invention.

Turing to FIG. 1B, it depicts a cut-away view of one embodiment 10 of the invention shown in FIG. 1A, along line b. The cut-away view depicts the interior of the main body 12 with the external wall 18 and the internal wall 16 depicted as lines. As was shown in FIG. 1A, the interior wall 16 defines a central aperture 14.

As visible in FIG. 1B, the main body 12 interior area defines at least one channel 20. The channel is filled with a fluid 22. The interior area channel 20 is in communication with the central aperture 14 via the fluid exit 24.

The fluid exit 24 is initially closed so as to prevent communication between the interior area channel 20 fluid 22 and the surrounding atmosphere. In one embodiment, this closing means 26 comprises a substrate of a material having a lower frangibility than the washer. The closing substrate wears down and is eventually breached as a workpiece is interested through the aperture 14. In another embodiment, the closing means 26 comprises a piece of contact paper. In another embodiment, the closing means 26 comprises a material defining a protrusion which extends into the aperture 14. The protrusion is worn down by the screw as it traverses the washer. In one embodiment, the protrusion is a flat membrane. In other embodiments, the protrusion has a convex profile where an edge of the protrusion extends outwards from the wall 16 into the aperture 14 and so is worn away by the workpiece.

Inasmuch as the main body 12 comprises a flexible material, once the closing means 26 are breached, the fluid 22 begins to exit the channel 20. The rate of egress may be increased by applying pressure to the main body 12 of the washer. Inasmuch as the fluid exit 24 faces the workpiece, any fluid 22 that exits the channel 20 contacts the workpiece and is spread to the workpiece. In instances where the workpiece is undergoing rotation as it passes through the aperture 14 (such as where the workpiece is a screw), the fluid 22 is also spread around the workpiece.

Figure 1C:
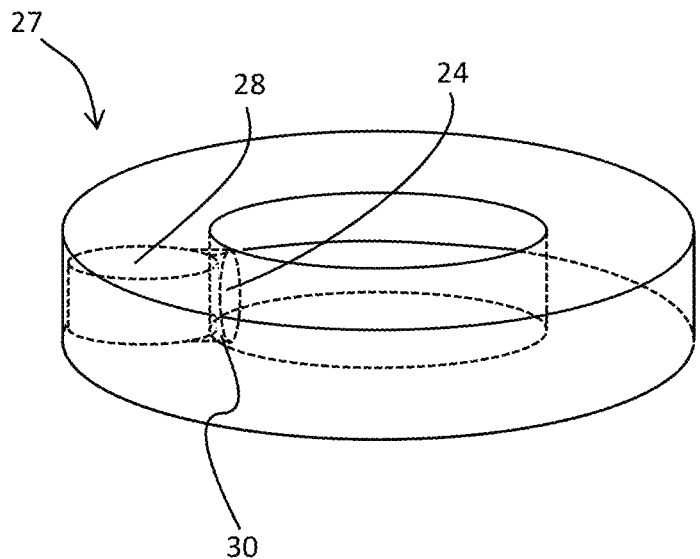
FIG. 1C depicts an overview of another embodiment of the invention.

An alternative embodiment 27 of the invention is shown in FIG. 1C. While in FIG. 1B, a channel 20 forms a ring around the washer, the embodiment shown in FIG. 1C includes one fluid chamber 28 which is defined in only one subpart of the main body. The fluid chamber 28 is in communication with the fluid exit 24 using a fluid channel 30. The fluid chamber 28 is sized to provide one measure of the flowable additive.

In other embodiments, not shown, the fluid chamber 28 or the fluid channel 20 is in communication with the interior surface of the washer not using a single channel, but using at least a portion of the interior wall of the washer. In this embodiment, the interior wall of the washer defines at least one area of weakness wherein upon application of pressure, the flowable liquid within the chamber 28 or the channel 20 exits the washer body.

Figure 1D:
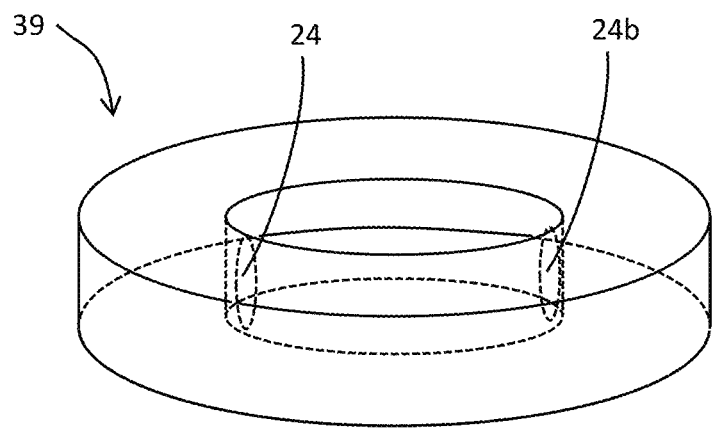
FIG. 1D depicts an overview of another embodiment of the invention.

A further embodiment is shown in FIG. 1D. In that embodiment 39, the main body includes a first fluid exit 24 and a second fluid exit 24b. In one embodiment, different materials are used for the first fluid exit 24 and the second fluid exit 24b, where the primary distinction between the materials is the amount of force that is required to result in breaching of each exit 24, 24b. In this embodiment 39, the second fluid exit 24b will result in delayed additional dispensing of the contents of the interior of the washer body. This embodiment may be used when two amounts of an adhesive should be deployed.

In another embodiment, not shown, each fluid exit is in communication with a distinct sub-chamber of the washer, such that each fluid exit can dispense a different additive or components which are mixed into a single additive (as is the case for two-part epoxy adhesive). In one embodiment, the different exits, each of which connects to a distinct region, also have different strength properties so as to break down at different times, allowing for delayed mixing of multiple components.

The details of the cooperation between the workpiece and the washer are described in conjunction with FIG. 2, below.

Fluid Detail

Any fastener-compatible fluid 22 may be deposited for administration in the channel 20. In one embodiment, the fluid 22 has a higher viscosity than what would normally be used in a given application. The fluids 22 must remain flowable, but do not have to be non-reactive. For example, in one embodiment, the fluid 22 is an adhesive which quickly dries out when exposed to the atmosphere. Inasmuch as there is no contact between the channel 20 and the external atmosphere until the fluid closing means 26 is breached, such a reactive fluid can be accommodated by the device 10.

Other potential fluids include:

| | |
|---|---|
| Adhesive | Screw Thread locker |
| Lubricant | Sealant |
| Silicone Additive | Latex Additive |
| Mortar | Fire retardant |
| Coloring Additive | Plumber's Putty |

For all of the potential fluids, the size and shape of the exit channel is optimized to maintain adequate flow. For some additives that have a high viscosity, more than one channel exit is defined. The device is capable of dispensing fluids with a high viscosity as the pressure applied by the screw to the main body of the washer causes the fluid to exit via the exit channel.

To distinguish between the various additive fluids, the washer main body is color coded, in one embodiment. For example, a color generally associated with a thread locker (blue and red) is used on the washer main body. In one embodiment, a brand name of the additive is printed on the washer, including a logo.

Washer and Screw Combination

Figure 2:
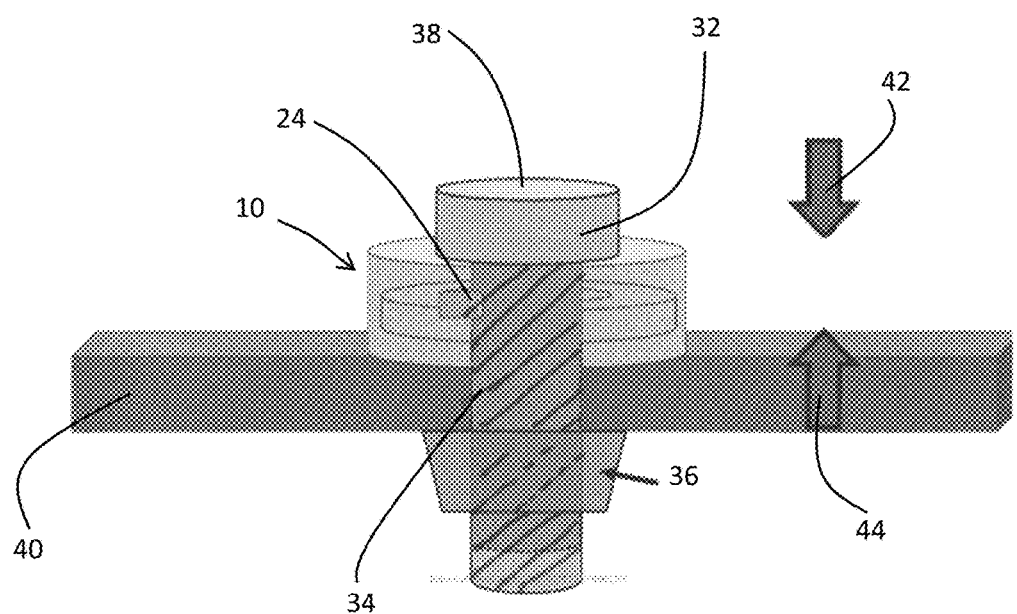
FIG. 2 depicts an overview of one embodiment of the invention.

FIG. 2 depicts the washer device 10 as used in conjunction with a screw 32. The screw 32 comprises a threaded shank 34 which receives a screw nut 36 on one end. The opposing end defines a screw head 38. The screw head may be any configuration, including one for receiving screwdrivers or wrenches.

Initially, as the screw 32 traverses the washer device 10, it frictionally engages the interior walls 16 of the washer and breaches the fluid exit 24. The fluid contained within the washer does not begin to exit the washer device 10 immediately, however. Instead, initial downwards force 42 on the device 10 must be applied. More of the fluid exits the device 10 as the screw head 38 applies more downward force 42 and the action of the screw nut 36 applies an upward force 44. As the device 10 comprises a deformable main body, the fluid continues to flow as the force is applied. However, the fluid exits and is conveyed by the threads 34 of the screw 32 shank rather than being applied to the installation surface 40. In this manner, the fluid is contained to the screw.

While the workpiece depicted in FIG. 2 is a screw, a similar effect would occur with a different workpiece, such as a nail or a rivet. The device 10 may be used in conjunction with non-threaded fasteners (not shown) in place of the screw 32. In some of those instances, the fluid exit 24 is breached not by the action of the screw thread 34, but rather by an initial application of force or via puncturing, or similar action. For non-threaded fasteners, the viscosity of the fluid is adjusted to flow around the fastener without the benefit of the threads, in one embodiment. In other instances, the washer is used with a nail that has a spiral shank, such as with deck screws. The embodiments with spiral shanks would not require pre-breaching of the fluid exit 24.

In one embodiment, the inside wall of the washer is substantially thinner than the remaining walls defining the washer. Therefore, as the screw 32 applies pressure on the washer, the inside walls fail first and release the contents of the washer unto the screw 32. In a different embodiment, only certain areas of the inside walls defining the washer are thinner, resulting in selective breaching of the interior walls. The configuration of the breaches is designed to facilitate the flowing action of the washer and liquid combination.

Manufacturing Details

Figure 3:
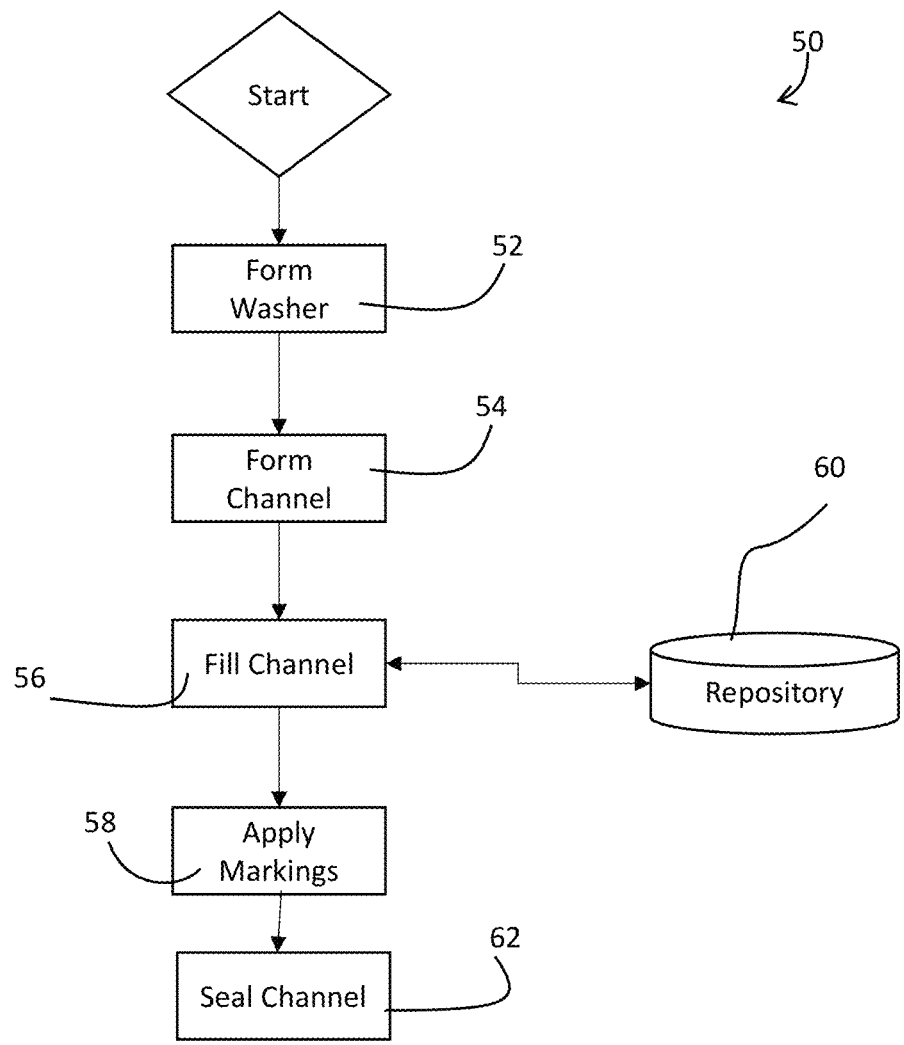
FIG. 3 depicts a flow chart of the manufacturing steps one embodiment of the invention.

A process for manufacturing 50 the device is shown in FIG. 3. The process begins with the definition of the general washer body or form 52. The shape of the washer form may be circular, rectangular, or another shape, so long as an internal wall is defined with an aperture in the middle to allow for dispensing of fluid.

Following the definition of the washer shape 52, the channel is formed 54. For the alternative embodiment of FIG. 1C, the chamber is formed at this step in place of the channel. The channel may be drilled into the washer form 52 or it may be formed as an integral step when the washer main body is formed 52. Integral manufacturing of the channel 54 and the main body 52 is performed where the method 50 employs additive manufacturing, such as three-dimensional printing.

In the weaker wall embodiment, the exterior walls forming the main body are formed from a material having a higher density and higher strength than the interior wall which is designed to be breachable. In one embodiment, the top and bottom walls of the washer comprise standard flat metal washers. The interior side wall comprises a breachable plastic while the exterior sidewalls comprise a hard and non-breachable plastic. In one such embodiment, the breachable plastic comprises a thinner version of the non-breachable wall material. In another embodiment, the breachable plastic comprises a different material. One wall material is a synthetic polymer such as Nylon 6. Most synthetic polymers in this family can be manufactured to any thickness, can include a color (or be transparent). Further, most can be used as feedstock in additive manufacturing processes.

Once the channel is formed 54, the channel is filled 56 with one or more liquids from a liquid repository 60. As the channel is filled 56, a total accounting of the liquid within the repository 60 is maintained and updated. Optionally, the process may include the addition of markings 58, as would be required to designate any expiration dates, warnings, or inventory numbers (as would be required where the fluid being added to the channel has a high monetary value).

Upon the filling of the channel 56, the fluid exit is sealed and the process results in a completed washer device containing a channel filled with a fluid.

ALTERNATIVE EMBODIMENTS

In another embodiment (not shown), the main body 12 contains more than one channel 20 accommodating more than one fluid. In yet another embodiment, the main body 12 defines only one channel, but the channel is divided into different sections. Each section has a separate fluid exit.

Another embodiment is designed to dispense a multi-part epoxy. In this embodiment, two channels are stacked on top of one another and are separated. The channel exits are likewise stacked, however, a first channel is shorter than a second and is open to the second channel, such as that the two liquids mix upon exiting the channel.

In yet another embodiment, the fluid is not introduced directly in the channel, but rather the fluid is first placed into a holder. The holder/fluid combination are installed into the washer main body. This holder combination is used when the multiple different additives are employed in the main body.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The embodiment of the invention in which an exclusive property or privilege is claimed is defined as follows:

1. A washer with integrated fluid distribution comprising:
   a washer body defining an outer ring having an aperture located centrally within said ring; and
   a channel enclosed within said outer ring and a first release channel exit and a second release channel exit in fluid communication with said aperture and an interior surface of said channel;
   wherein said channel is filled with a dispensing fluid and said first and second release channel exit is reversibly closed;
   wherein said body comprises a compressible material;
   wherein each release channel exit is opened when pressure is applied to said washer body and said dispensing fluid exits the channel via the opened release channel exit;
   wherein said first channel exit is closed with a material having a first failure rate and the second channel exit is closed with a material having a second failure rate and wherein said second failure rate is different from the first failure rate.

2. The washer of claim 1 wherein said dispensing fluid is a sealant.

3. The washer of claim 1 wherein said dispensing fluid is a locking fluid.

4. The washer of claim 1 wherein said channel comprises two regions not in communication with one another wherein a first channel region is in fluid communication with the first fluid exit and the second channel region is in fluid communication with the second exit.

5. The washer of claim 1 wherein said first region is filled with a first part of a two-part epoxy sealant and said second region is filled with a second part of said epoxy sealant.

6. The washer of claim 1 wherein the contents of said channel are indicated with an indicia on said channel body.

7. The washer of claim 6 wherein said indicia comprises a color code.

8. The washer of claim 6 wherein said indicia comprises an identifier.

9. The washer of claim 1 wherein said aperture is adapted to receive a workpiece having a shank wherein friction produced by said shank breaches the release channel exit.

10. The washer of claim 1 wherein said aperture is adapted to receive a workpiece having a shank wherein force against the washer main body produced by said workpiece breaches the release channel exit.

11. The washer of claim 1 further comprising a pouch wherein said pouch encapsulates each filled washer and hermetically seals each washer from an external atmosphere.

* * * * *